United States Patent
Imaeda

(10) Patent No.: US 8,165,048 B2
(45) Date of Patent: Apr. 24, 2012

(54) WIRELESS COMMUNICATION SYSTEM, TERMINAL STATION, AND WIRELESS COMMUNICATION METHOD

(75) Inventor: Eiji Imaeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 12/412,266

(22) Filed: Mar. 26, 2009

(65) Prior Publication Data
US 2009/0252140 A1 Oct. 8, 2009

(30) Foreign Application Priority Data

Apr. 7, 2008 (JP) ................................. 2008-099803

(51) Int. Cl.
*H04B 7/00* (2006.01)
(52) U.S. Cl. .................................................... 370/310
(58) Field of Classification Search ........... 370/310–340
See application file for complete search history.

(56) References Cited

U.S. PATENT DOCUMENTS

| 2006/0203789 A1* | 9/2006 | Iacono et al. | 370/338 |
| 2010/0128652 A1* | 5/2010 | Lee et al. | 370/315 |

FOREIGN PATENT DOCUMENTS

| JP | 64-60118 | 3/1989 |
| JP | 2003-520545 | 7/2003 |
| JP | 2005-45384 | 2/2005 |
| WO | 01/54230 A1 | 7/2001 |

\* cited by examiner

*Primary Examiner* — Chi Pham
*Assistant Examiner* — Fan Ng
(74) *Attorney, Agent, or Firm* — Fitzpatrick, Cella, Harper & Scinto

(57) ABSTRACT

The invention includes a wireless communication system including a control station which transmits a wireless signal by one of a plurality of schemes, and a terminal station which receives the transmitted wireless signal using a plurality of directional antennas by one of a plurality of schemes. The control station repeatedly transmits a wireless signal while sequentially switching the plurality of schemes. The terminal station switches the plurality of schemes at a cycle different from the switching cycle of the control station, changes the directivity direction of the directional antenna every time the terminal station receives all wireless signals transmitted by the plurality of schemes, and detects the reception state of each of the wireless signals which have been transmitted by the plurality of schemes and received in the directivity directions of the directional antenna.

14 Claims, 16 Drawing Sheets

FIG. 4
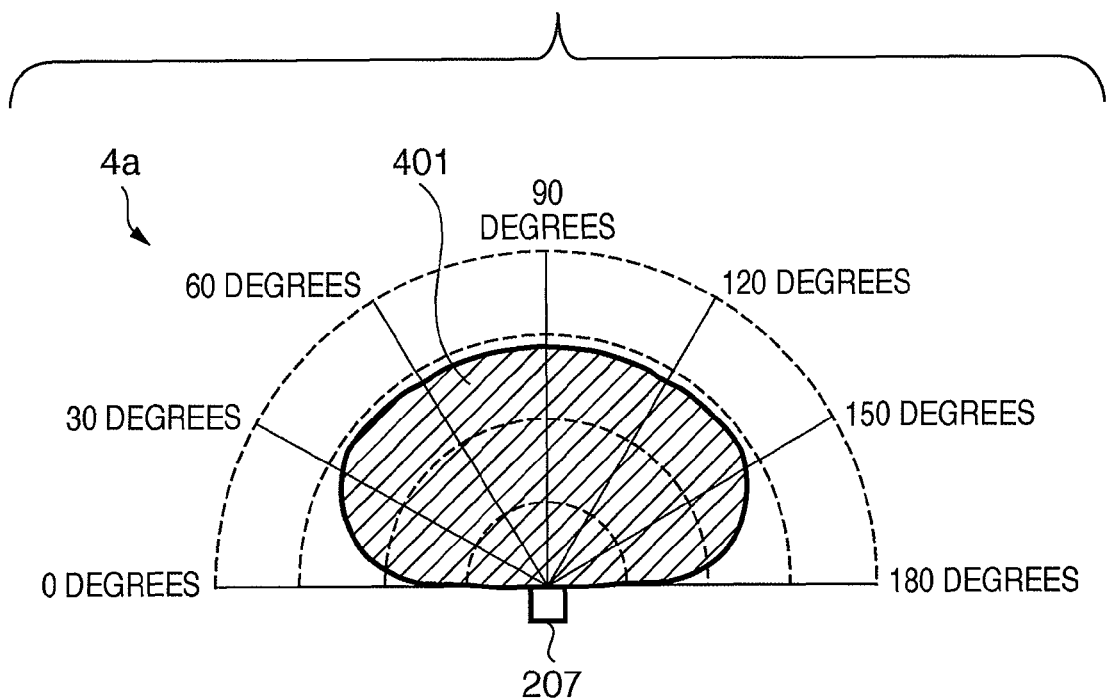
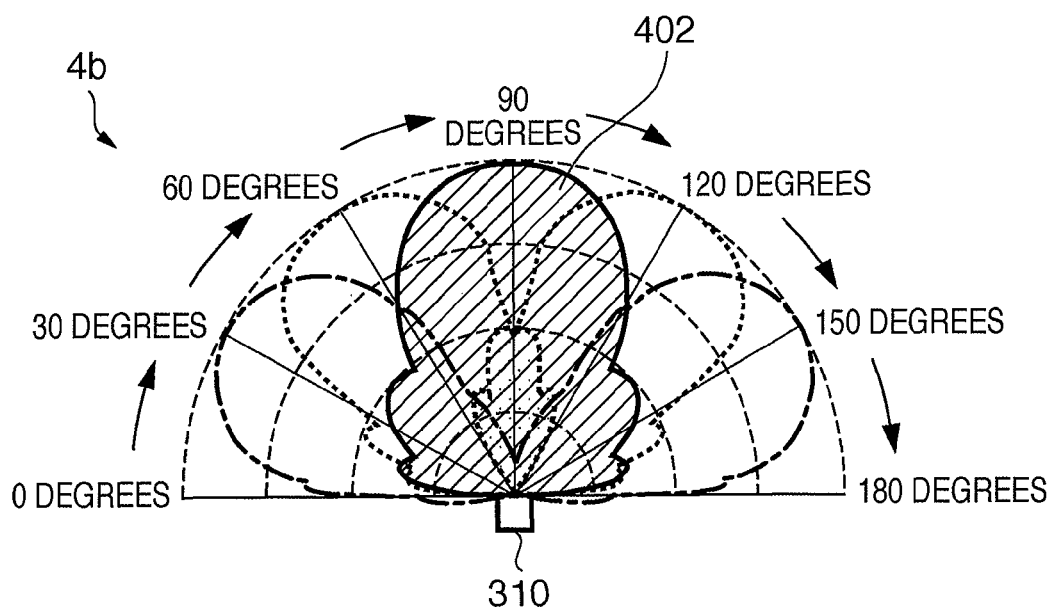

FIG. 10

SCAN RESULT LIST OF TERMINAL STATION 1

| BEAM DIRECTION | POLARIZATION | RECEPTION STRENGTH |
|---|---|---|
| 0 | H | 0 |
| 0 | V | 0 |
| 30 | H | 0 |
| 30 | V | 0 |
| 60 | H | 4 |
| 60 | V | 3 |
| 90 | H | 8 |
| 90 | V | 6 |
| 120 | H | 5 |
| 120 | V | 3 |
| 150 | H | 0 |
| 150 | V | 0 |
| 180 | H | 0 |
| 180 | V | 0 |

← BEST CONDITIONS

| | | BEAM DIRECTION | POLARIZATION | RECEPTION STRENGTH |
|---|---|---|---|---|
| FIRST ANTENNA | TERMINAL STATION 1 | 90 | H | 8 |
| | | 90 | V | 7 |
| | TERMINAL STATION 2 | 150 | H | 6 |
| | | 150 | V | 6 |
| | TERMINAL STATION 3 | 30 | H | 4 |
| | | 30 | V | 5 |
| | TERMINAL STATION 4 | 120 | H | 3 |
| | | 120 | V | 3 |
| | TERMINAL STATION 5 | 60 | H | 2 |
| | | 60 | V | 3 |
| SECOND ANTENNA | TERMINAL STATION 1 | 120 | H | 7 |
| | | 120 | V | 6 |
| | TERMINAL STATION 2 | 180 | H | 5 |
| | | 180 | V | 4 |
| | TERMINAL STATION 3 | 60 | H | 6 |
| | | 60 | V | 6 |
| | TERMINAL STATION 4 | 120 | H | 2 |
| | | 120 | V | 3 |
| | TERMINAL STATION 5 | 60 | H | 3 |
| | | 60 | V | 3 |

FIG. 12

| | TRANSMISSION CONDITION 1 | | TRANSMISSION CONDITION 2 | |
|---|---|---|---|---|
| | FIRST ANTENNA OF CONTROL STATION USES H AND SECOND ANTENNA OF CONTROL STATION USES V | | FIRST ANTENNA OF CONTROL STATION USES H AND SECOND ANTENNA OF CONTROL STATION USES V | |
| TERMINAL STATION 1 | 8 | 6 | 7 | 7 |
| TERMINAL STATION 2 | 6 | 4 | 6 | 5 |
| TERMINAL STATION 3 | 4 | 6 | 5 | 6 |
| TERMINAL STATION 4 | 3 | 3 | 3 | 2 |
| TERMINAL STATION 5 | 2 | 3 | 3 | 3 |
| | 12a | 12b | 12c | 12d |

12a : TERMINAL STATION FACES FIRST ANTENNA, AND RECEIVES WITH HORIZONTAL POLARIZATION

12b : TERMINAL STATION FACES SECOND ANTENNA, AND RECEIVES WITH VERTICAL POLARIZATION

12c : TERMINAL STATION FACES FIRST ANTENNA, AND RECEIVES WITH VERTICAL POLARIZATION

12d : TERMINAL STATION FACES SECOND ANTENNA, AND RECEIVES WITH HORIZONTAL POLARIZATION

WIRELESS COMMUNICATION SYSTEM, TERMINAL STATION, AND WIRELESS COMMUNICATION METHOD

BACKGROUND OF THE INVENTION

1. Field of the Invention

The present invention relates to a wireless communication technique for optimizing transmission/reception conditions in transmitting/receiving a wireless signal.

2. Description of the Related Art

In recent years, along with popularization of devices equipped with a wireless communication function, wireless communication is increasingly used in communication between the devices. For example, consumer devices such as a home theater are also equipped with a wireless communication function.

Along with this, data used in wireless communication include not only conventional computer data but also video and audio stream data.

In general, the amount of stream data is larger than that of conventional computer data. For this reason, a wireless communication device which processes stream data needs to execute processing for reducing transmission delay fluctuations in communication. In the case of a wireless communication device included in, e.g., a home theater, one control station such as a DVD player transmits stream data to a plurality of terminal stations such as loudspeakers. The control station, therefore, needs to broadcast the data.

Various communication methods for the wireless communication devices have been proposed.

As an example, a communication method using redundant multiplexing is available. In the method, identical stream data are multiplexed by frequency multiplexing, code multiplexing, or polarization multiplexing, multiplexed data is transmitted via a redundant communication path, and the receiving side selects a path whose reception state is good, thereby improving connection quality.

There has been proposed a communication method in which the transmitting side transmits data to a number of receiving sides via a wide directional antenna, and each of the receiving sides points a beam toward the transmission side using its narrow directional antenna, thereby improving a wireless signal strength between the transmitting side and the receiving side, and achieving a high communication rate.

Furthermore, there has been proposed a communication method which combines those communication methods (the communication method using redundant multiplexing and that using directional antennas).

In the communication method which combines the communication method using redundant multiplexing and that using directional antennas, it is necessary to set a plurality of parameters, i.e., a multiplexing scheme between the transmitting side and the receiving side and the beam direction on the receiving side.

Such communication method needs to execute "training processing" for determining, through training, optimum transmission/reception conditions such as an optimum multiplexing scheme and an optimum beam direction.

As the switching method of the communication scheme using redundant multiplexing, the following method has been devised. That is, identical codes are alternately time-divisionally transmitted with horizontal polarization and vertical polarization, and when detecting a decrease in reception power, the receiving side switches the polarization type to the other (see, e.g., Japanese Patent Laid-Open No. 64-060118).

Furthermore, as a method of detecting an optimum polarization type on the transmitting and receiving sides, the following method has been devised. That is, a polarization plane angle on the transmitting side is rotated, and an optimum state is detected by closed-loop control or open-loop control on the receiving side (see, e.g., Japanese Patent Laid-Open No. 2003-520545).

On the other hand, as a method of detecting an optimum beam direction of a reception antenna, the following method has been devised. That is, a beam is pointed toward the transmitting side by scanning all beam directions and determining a radio wave arrival direction (see, e.g., Japanese Patent Laid-Open No. 2005-045384).

If, however, the training processing is executed using a conventional method, the receiving side must determine reception conditions by sequentially switching settable multiplexing schemes and polarization types after detecting a transmission signal and synchronizing transmission and reception paths.

For this reason, in a wireless communication system based on the premise that there exist a control station and a plurality of terminal stations and the control station broadcasts data, it takes time to complete the training processing. This is because in such wireless communication system, all transmission and reception communication paths must be synchronized, and after that, pairs of multiplexing schemes and pairs of beam directions must be sequentially switched and measured while synchronizing the transmission and reception paths.

In addition, if a plurality of control stations are provided to improve the reliability of wireless communication, the training processing must be executed a number of times equal to the number of control stations, thereby prolonging the training processing time.

SUMMARY OF THE INVENTION

The present invention has been made in consideration of the aforementioned problems.

A wireless communication system according to the present invention has the following configuration. That is, a wireless communication system comprises a control station, and a terminal station which receives, by using a directional antenna, a training signal transmitted from the control station, the control station includes a transmission unit configured to repeatedly transmit a training signal while sequentially switching N (N≧2) types of multiplexing schemes, and the terminal station includes a reception standby unit configured to stand by for reception of the training signal while switching the N types of multiplexing schemes at a cycle different from a switching cycle of the control station, a changing unit configured to change a directivity direction of the directional antenna for each process of standing by for reception of the training signal during an interval of a square of N, and a detection unit configured to detect a reception state of a training signal received in each directivity direction of the directional antenna.

According to the present invention, in a wireless communication system which includes a control station for broadcasting data and a plurality of terminal stations for receiving the data, it is possible to shorten the processing time of the training processing for determining optimum transmission/reception conditions.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is views showing the directivities of the antennas of the control station 101 and terminal station 1 (102), respectively;

FIG. 10 is a table showing an example of a scan result list;

FIG. 11 is a table showing a list which indicates a reception state for each pair of an optimum beam direction and polarization of the reception antenna of each terminal station in communication with the control station 101;

FIG. 12 is a table showing a list of the reception strengths of the terminal stations;

DESCRIPTION OF THE EMBODIMENTS

Preferred embodiments of the present invention will now be described in detail in accordance with the accompanying drawings.

First Embodiment

1. Configuration of Wireless Communication System

Figure 1:
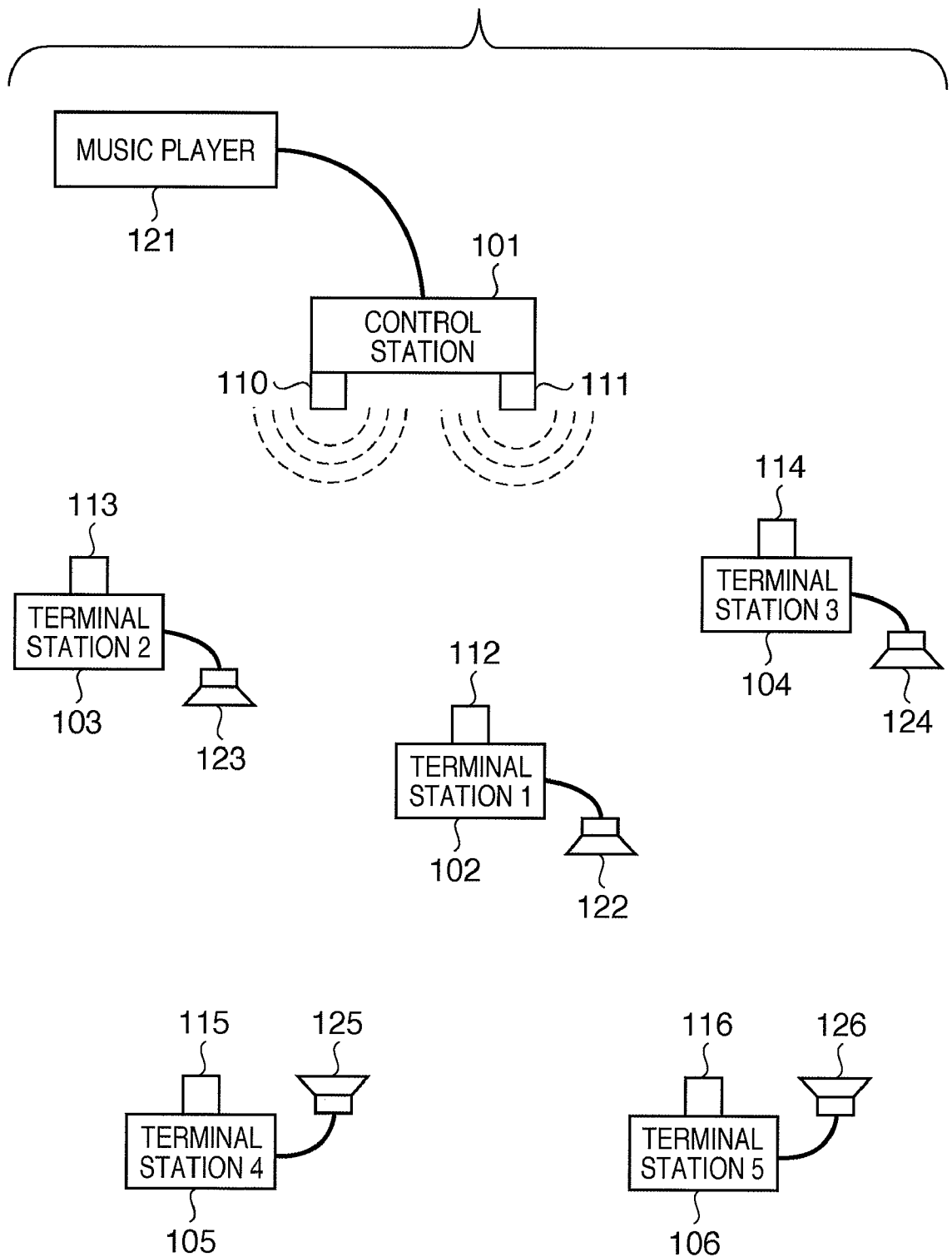
FIG. 1 is a view showing the configuration of a wireless communication system according to the first embodiment.

FIG. 1 shows the configuration of a wireless communication system according to the first embodiment of the present invention. Referring to FIG. 1, reference numeral 101 denotes a control station; 102 to 106, terminal stations 1 to 5, respectively; 110 and 111, a first and second antennas of the control station 101, respectively; 112 to 116, antennas of terminal stations 1 to 5 (102 to 106), respectively; 121, a music player for generating the stream data of surround music; and 122 to 126, loudspeakers.

The music player 121 is connected to the control station 101 via a cable. The stream data of surround music, which has been generated in the music player 121, is transferred to the control station 101. The control station 101 wirelessly transmits the transferred stream data to terminal stations 1 to 5 (102 to 106).

Terminal station 1 (102) is connected with the loudspeaker 122 via a cable, and acoustically reproduces the surround music at the loudspeaker 122 in accordance with the stream data wirelessly received from the control station 101. Similarly, other terminal stations 2 to 5 (103 to 106) acoustically reproduce the surround music at the loudspeakers 123 to 126 in accordance with the wirelessly received stream data, respectively.

The control station 101 and terminal stations 1 to 5 (102 to 106) are distributed and located within a room, and form a PAN (Personal Area Network) by wireless communication. The control station 101 controls the PAN as a whole. Terminal stations 1 to 5 (102 to 106) operate in accordance with the instructions of the control station 101.

The control station 101 can wirelessly transmit control data to terminal stations 1 to 5 (102 to 106) at a low transfer rate, and also wirelessly transmit the stream data of the surround music at a high transfer rate. Terminal stations 1 to 5 (102 to 106) can wirelessly transmit control data to the control station 101 at a low transfer rate.

2. Internal Arrangement of Control Station

Figure 2:
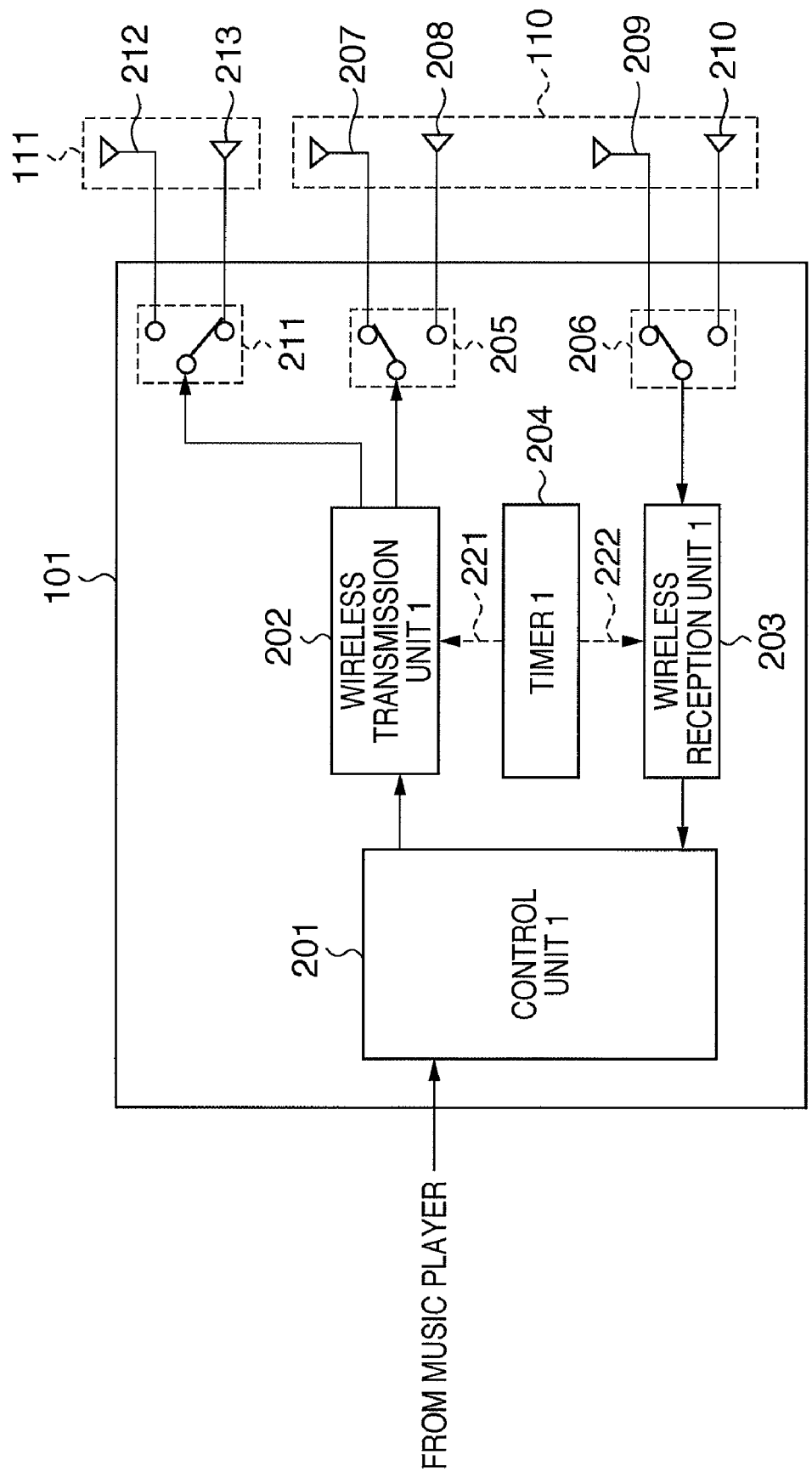
FIG. 2 is a block diagram showing the internal arrangement of a control station 101.

FIG. 2 shows the internal arrangement of the control station 101. Reference numeral 201 denotes control unit 1; 202, wireless transmission unit 1; 203, wireless reception unit 1; and 204, timer 1 (a first timer) for measuring the timing of a wireless frame cycle. Note that the frame cycle indicates a period of time during which a wireless frame is transmitted or received. Reference numerals 205, 206, and 211 denote switches; 207, a first vertical polarization transmission antenna for wireless transmission with vertical polarization; and 208, a first horizontal polarization transmission antenna for wireless transmission with horizontal polarization.

Furthermore, reference numeral 209 denotes a vertical polarization reception antenna for wireless reception with vertical polarization; 210, a horizontal polarization reception antenna for wireless reception with horizontal polarization; 212, a second vertical polarization transmission antenna for wireless transmission with vertical polarization; and 213, a second horizontal polarization transmission antenna for wireless transmission with horizontal polarization.

Control unit 1 (201) controls the operation of the control station 101 as a whole, and controls transmission/reception of control commands to/from terminal stations 1 to 5 (102 to 106). Control unit 1 (201) also controls wireless transmission of the stream data of the surround music, which has been transferred from the music player 121, to terminal stations 1 to 5 (102 to 106).

Timer 1 (204) measures a time for periodically outputting a transmission slot timing signal 221 for sending a notification of wireless frame transmission timing, and a reception slot timing signal 222 for sending notification of wireless frame reception timing. Note that a wireless frame is a set of data to be wirelessly transmitted after control information necessary for wireless communication is added to the data which have been packetized for each predetermined length (to be described in detail later).

Wireless transmission unit 1 (202) converts the stream data received from control unit 1 (201) into a wireless signal. Wireless transmission unit 1 (202) can output two types of wireless signals added with different pieces of header information for the same stream data.

Wireless transmission unit 1 (202) performs convolutional coding for error correction on input data, data modulation using the OFDM system, and orthogonal modulation at an intermediate frequency and modulation at a wireless frequency, thereby generating a transmission signal.

The switch 205 is controlled by a control signal (not shown) from control unit 1 (201), and outputs the first wireless signal of wireless transmission unit 1 (202) to the first vertical polarization transmission antenna 207 or the first horizontal polarization transmission antenna 208. Similarly, the switch 211 is controlled by a control signal (not shown) from control unit 1 (201), and outputs the second wireless signal of wireless transmission unit 1 (202) to the second vertical polarization transmission antenna 212 or the second horizontal polarization transmission antenna 213.

Control unit 1 (201) changes a symbol length and subcarrier division count in accordance with the type of data to be transmitted, and controls wireless transmission unit 1 (202) to wirelessly transmit data at a high or low data rate.

The switch 206 is controlled by a control signal (not shown) from control unit 1 (201), and outputs the wireless signal received at the vertical polarization reception antenna 209 or the horizontal polarization reception antenna 210 to wireless reception unit 1 (203).

Wireless reception unit 1 (203) decodes the received wireless signal to generate data, and sends the data to control unit 1 (201). Wireless reception unit 1 (203) detects an input wireless signal at a wireless frequency and intermediate frequency, and performs OFDM demodulation on the signal to generate a symbol for each subcarrier. Furthermore, wireless reception unit 1 (203) performs Viterbi decoding as error correction processing, thereby generating reception data.

3. Internal Arrangement of Terminal Station

Figure 3:
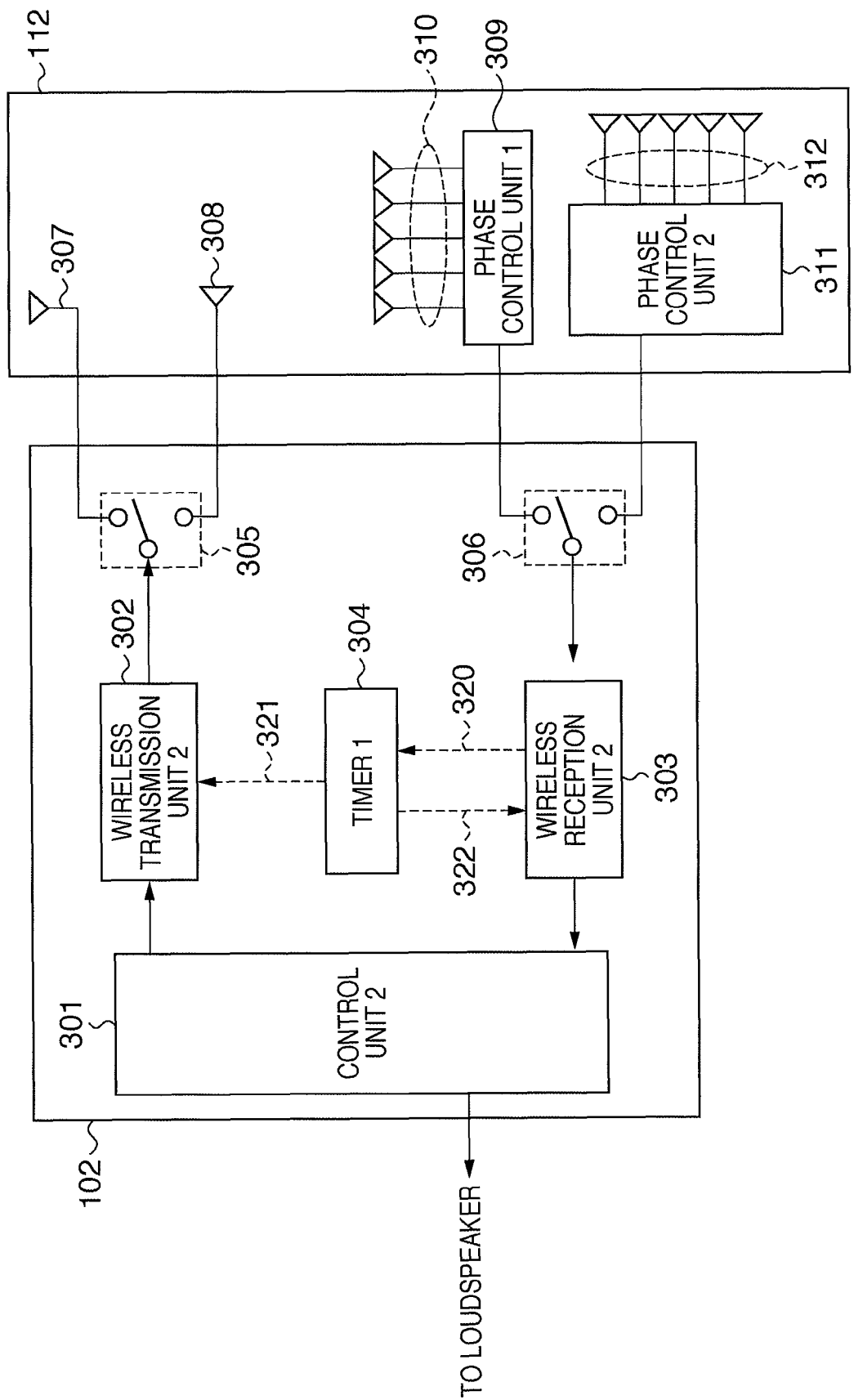
FIG. 3 is a block diagram showing the internal arrangement of terminal station 1 (102)

FIG. 3 shows the internal arrangement of terminal station 1 (102). Note that the internal arrangement of each of terminal stations 2 to 5 (103 to 106) is the same as that (FIG. 3) of terminal station 1 (102).

Referring to FIG. 3, reference numeral 301 denotes control unit 2; 302, wireless transmission unit 2; 303, wireless reception unit 2; 304, timer 2 (a second timer) for measuring the timing of a wireless frame cycle; 305 and 306, switches; 307, a vertical polarization transmission antenna for wireless transmission with vertical polarization; 308, a horizontal polarization transmission antenna for wireless transmission with horizontal polarization; 309, phase control unit 1 for controlling the phase of each antenna element; 310, a vertical polarization reception array antenna for wireless reception with vertical polarization; 311, phase control unit 2 for controlling the phase of each antenna element; and 312, a horizontal polarization reception array antenna for wireless reception with horizontal polarization.

Control unit 2 (301) controls the operation of terminal station 1 (102) as a whole. Control unit 2 (301) also selects the stream data of a surround channel from the received stream data to generate a music signal, and drives the loudspeaker 122 to acoustically reproduce the music signal.

Timer 2 (304) measures a time for periodically outputting a transmission slot timing signal 321 for sending a notification of wireless frame transmission timing, and a reception slot timing signal 322 for sending a notification of wireless frame reception timing. Timer 2 (304) operates to reset and restart measurement by a reception timing restart signal 320 output from wireless reception unit 2 (303).

Wireless transmission unit 2 (302) converts the data received from control unit 2 (301) into a wireless signal. The switch 305 is controlled by control unit 2 (301) with a control signal (not shown), and outputs the wireless signal of wireless transmission unit 2 (302) to the vertical polarization transmission antenna 307 or horizontal polarization transmission antenna 308.

Similarly to wireless transmission unit 1 (202), wireless transmission unit 2 (302) performs convolutional coding for error correction on input data, data modulation using the OFDM system, and orthogonal modulation at an intermediate frequency and modulation at a wireless frequency, thereby generating a transmission signal.

Similarly to wireless reception unit 1 (203), wireless reception unit 2 (303) detects an input wireless signal at a wireless frequency and intermediate frequency, and performs OFDM demodulation on the signal to generate a symbol for each subcarrier. Furthermore, wireless reception unit 2 (303) performs Viterbi decoding as error correction processing, thereby generating reception data.

If a symbol time length on the transmitting side becomes longer, an SNR (Signal-to-Noise Ratio) on the receiving side improves. This makes it possible to receive data at a farther location. If the subcarrier division count on the transmitting side becomes smaller, an SNR on the receiving side improves. This also makes it possible to receive data at a farther location.

That is, under the transmission/reception conditions of the same antenna gain, it is possible to receive, at a farther location, a wireless signal transmitted at a low data rate compared with a wireless signal transmitted at a high data rate.

Phase control unit 1 (309) and the vertical polarization reception array antenna 310 form a vertical polarization adaptive array antenna. Phase control unit 2 (311) and the horizontal polarization reception array antenna 312 form a horizontal polarization adaptive array antenna.

Phase control unit 1 (309) and phase control unit 2 (311) are controlled by control unit 2 (301) with a control signal (not shown). Note that the adaptive array antenna is a well-known technique, and a detailed description thereof will be omitted. In the adaptive array antenna, by controlling the phase of each of a number of antenna elements, the antenna gain can have directivity and it is possible to control the directivity toward an arbitrary direction.

4. Directivity

FIG. 4 4a is a view showing the directivity of the first vertical polarization transmission antenna 207 of the control station 101. A shaded range 401 is a range within which a gain equal to or more than a predetermined value is obtained. As shown in FIG. 4 4a, the first vertical polarization transmission antenna 207 is a wide directional antenna which obtains an approximately uniform gain within a wide range in the forward direction of the antenna.

The first horizontal polarization transmission antenna 208, second vertical polarization transmission antenna 212, and second horizontal polarization transmission antenna 213 of the control station 101 have the same directivity as in FIG. 4 4a. Furthermore, the vertical polarization reception antenna 209 and horizontal polarization reception antenna 210 of the control station 101, and the vertical polarization transmission antenna 307 and horizontal polarization transmission antenna 308 of terminal station 1 (102) have the same directivity as in FIG. 4 4a.

FIG. 4 4b is a view showing the directivity of the vertical polarization reception array antenna 310 of terminal station 1 (102). A shaded range 402 is a range within which a gain equal to or more than a predetermined value is obtained. As shown in FIG. 4 4b, the vertical polarization reception array antenna 310 is a narrow directional antenna which has strong gain directivity in a specific direction. Note that the direction of directivity is controlled by phase control unit 1 (309), and can be arbitrarily changed between 0° to 180° in steps of 30°.

The horizontal polarization reception array antenna 312 of terminal station 1 (102) has the same directivity as in FIG. 4 4b. Phase control unit 1 (309) and phase control unit 2 (311) can control to use only some of the antenna elements. In this case, each of the vertical polarization reception array antenna 310 and the horizontal polarization reception array antenna 312 functions as a wide directional antenna having the same directivity as in FIG. 4 4a.

As seen in FIG. 4, a wide directional antenna has characteristics in that a gain necessary for wireless communication can be obtained within a wide angle range but the transmittable distance is short. To the contrary, a narrow directional antenna has characteristics in that the transmittable distance is long but an angle range within which a gain necessary for wireless communication can be obtained is narrow.

Combining the modulation schemes (modulation frequencies) of wireless transmission unit 1 (202) and wireless reception unit 2 (303) gives the followings.

- If the data rate is made lower and a wide directional antenna is used, wireless communication within a wider range is possible with respect to a necessary transmittable distance.
- If the data rate is made higher and a narrow directional antenna is used, a wireless communicable range is narrower with respect to the necessary transmittable distance.
- When a narrow directional antenna is used, therefore, it is necessary to point the directivity of the antenna toward the transmitting side.

For this reason, in this embodiment, assume that as for a low data rate control command bilaterally wirelessly communicated between the control station 101 and terminal stations 1 to 5 (102 to 106), the transmitting side and the receiving side communicate with each other using a wide directional antenna or non-directional antenna. Assume also that the transmitting side transmits high data rate stream data via a wide directional antenna, and the receiving side receives them via a narrow directional antenna whose directivity is pointed toward the transmitting side.

5. Sequence of Training Processing

The configuration of the control station 101 and terminal stations 1 to 5 (102 to 106) is as shown in FIG. 1. A polarization type and antenna directivity direction suitable for wireless communication, however, are not determined only based on the configuration, and are different in accordance with, e.g., circumstances (an installation environment) including walls, ceilings, and obstructions. It is therefore necessary to determine the polarization type and antenna directivity direction suitable for wireless communication in the installation environment by measuring them at the actual installation location.

The wireless communication system executes "training processing" in which the control station 101 determines the reception states of terminal stations 1 to 5 (102 to 106) to decide the polarization type and directivity direction, before wirelessly communicating the stream data of surround music.

Figure 5:
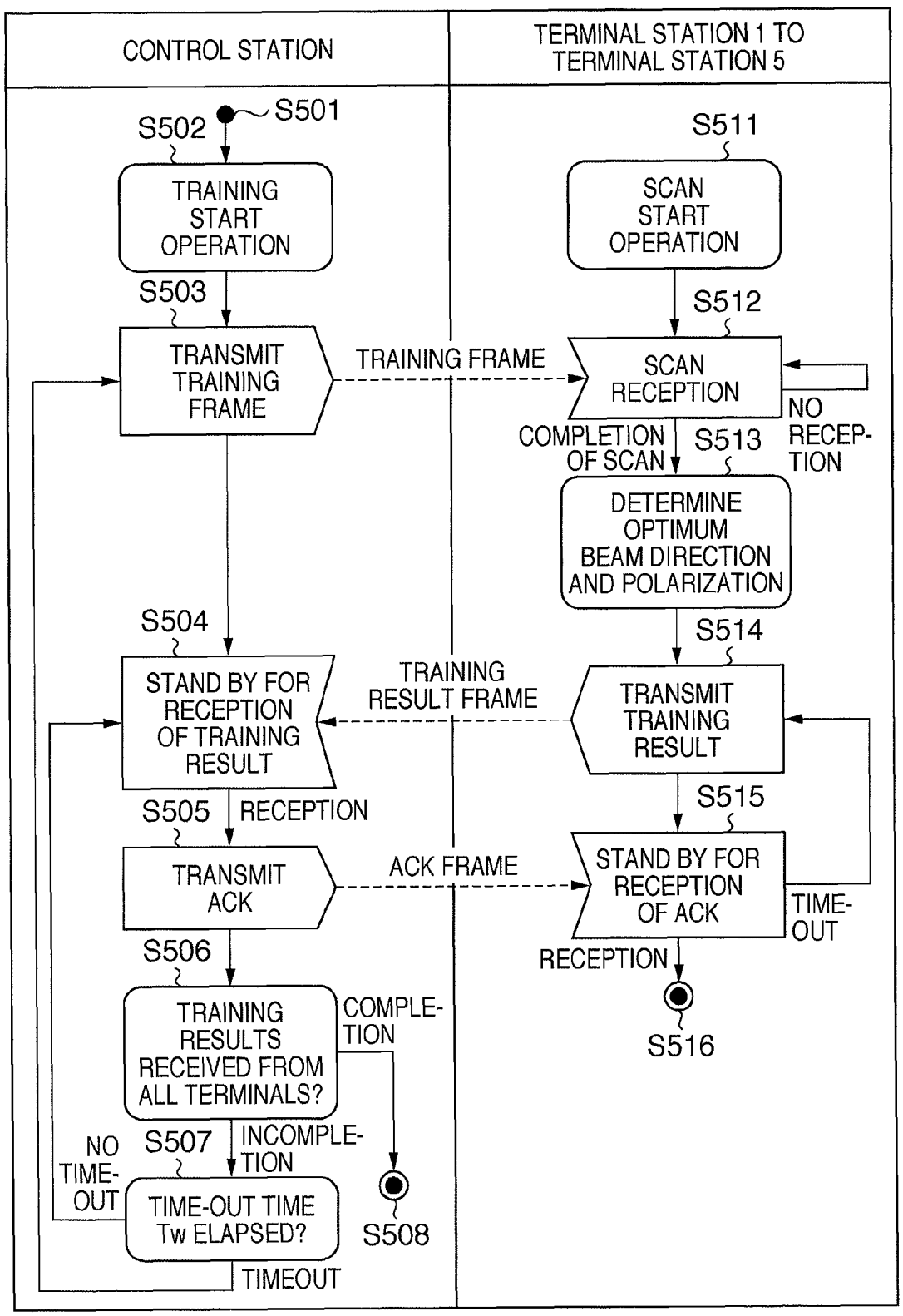
FIG. 5 is a flowchart illustrating the sequence of training processing in the wireless communication system.

FIG. 5 is a flowchart illustrating the sequence of the training processing in the wireless communication system according to this embodiment. The left side of FIG. 5 shows a processing sequence in the control station 101, and the right side of FIG. 5 shows a processing sequence in terminal stations 1 to 5 (102 to 106).

Note that although FIG. 5 only shows, as the processing in the control station 101, processing using the first antenna 110, processing using the second antenna 111 is also the same. Furthermore, since terminal stations 1 to 5 (102 to 106) asynchronously execute the processing shown in FIG. 5, FIG. 5 only shows the processing in one of the terminal stations.

Figure 6:
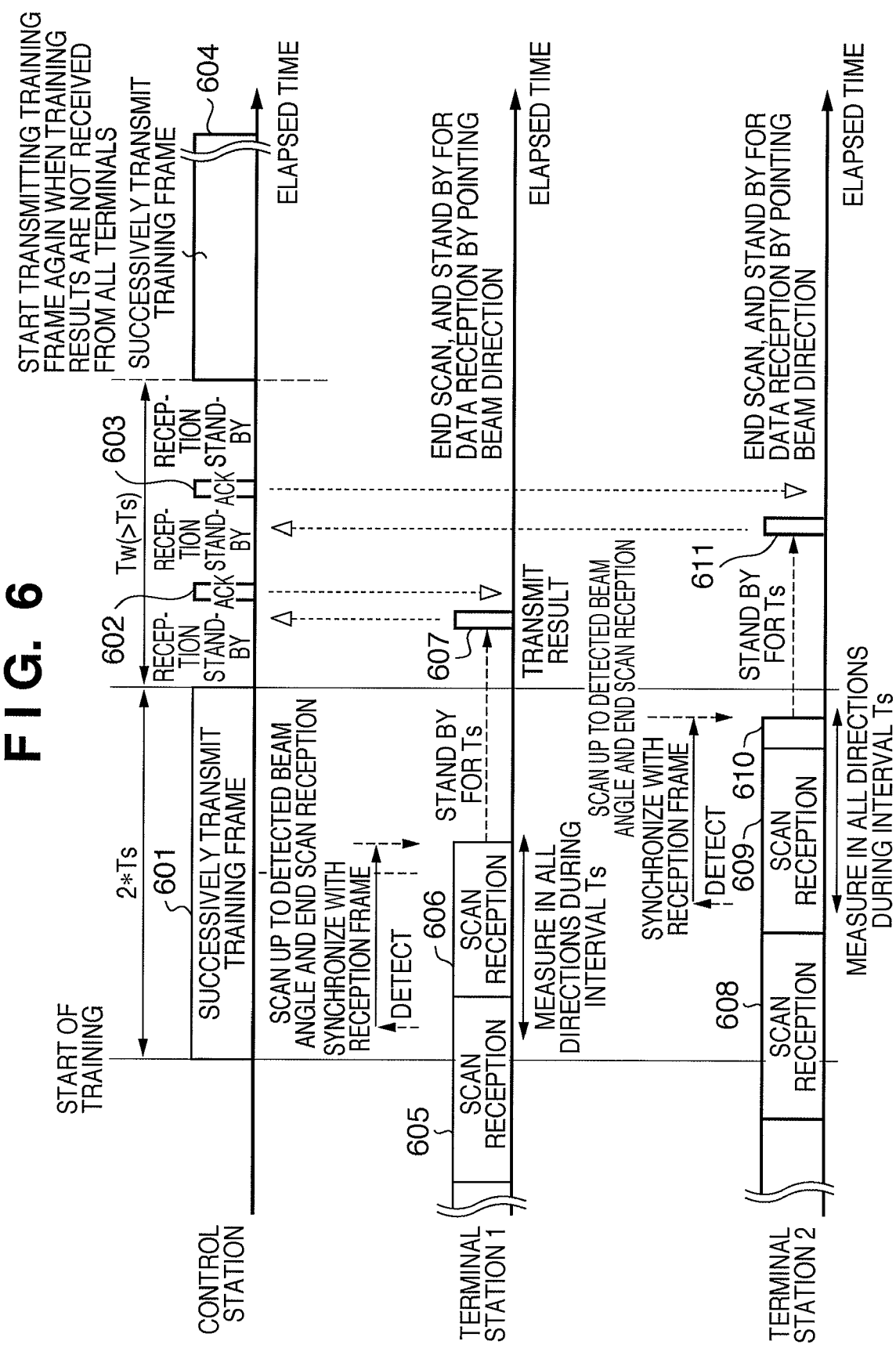
FIG. 6 shows timing charts for representing, along the elapsed time, transmission and reception between the control station 101 and terminal stations 1 and 2 (102 and 103) in executing the training processing.

FIG. 6 shows timing charts for representing, along the elapsed time, transmission and reception between the control station 101 and terminal stations 1 and 2 (102 and 103) in executing the flowchart shown in FIG. 5. The sequence of the training processing will be explained below with reference to FIGS. 5 and 6.

When the user performs a scan start operation in each of terminal stations 1 to 5 (102 to 106), each terminal station accepts it in step S511. In step S512, each of terminal stations 1 to 5 (102 to 106) starts scan reception of a training frame (training signal). The scan reception is an operation for switching the directivity direction and polarization type of a narrow directional reception antenna (i.e., switching N (N≧2) types of multiplexing schemes) to determine a directivity direction and polarization type in an optimum reception state.

In the scan reception, assume that a process of scanning all polarization types in all directivity directions to check reception states is regarded as one scan. As denoted by reference numerals 605, 606, 608, 609 in FIG. 6, each terminal station repeats the scan reception until it succeeds.

When the user performs a training start operation for the control station 101, the control station 101 accepts it in step S501. In step S502, the control station 101 starts wireless transmission of a training frame 601. The control station 101 executes the training frame transmission for a predetermined time 2*Ts, where Ts is a period of time necessary for the terminal station to execute one scan of the scan reception, and has a predetermined value.

The training frame transmission processing (step S503) and the scan reception processing (step S512) will be described in detail later.

When each of terminal stations 1 to 5 (102 to 106) completes the scan reception, the process advances to step S513 to determine the optimum directivity direction and polarization type of the reception antenna on the basis of a scan reception result (detection result). In step S514, to notify the control station 101 of the optimum directivity direction and polarization type obtained as a result of the determination, each terminal station transmits a training result frame (e.g., 607 or 611).

When the time 2*Ts elapses, the control station 101 stands by for a time Tw to receive the training result frames transmitted from terminal stations 1 to 5 (102 to 106) in step S504. Assume that Tw is a time during which the terminal stations may transmit the training result frames (e.g., 607 and 611), and is previously set to a time longer than Ts. In this embodiment, Tw=2*Ts is set.

If the control station 101 successfully receives the training result frames while standing by for the time Tw, it returns ACK frames (e.g., 602 and 603) indicating reception completion to the terminal stations on the transmitting side in step S505.

Terminal stations 1 to 5 (102 to 106) which have transmitted the training result frames stand by for reception of the ACK frames in step S515. If each terminal station cannot receive an ACK frame destined to itself within a predetermined time in step S515, the process returns to step S514 to retransmit the training result frame. Each terminal station then stands by for reception of an ACK frame in step S515.

If each terminal station receives an ACK frame (e.g., 607 or 611) destined to itself, the process advances to step S516 to end the training processing.

In this embodiment, assume that polarization for transmission and reception of the training result frames (e.g., 607 and 611) and the ACK frames (e.g., 602 and 603) is fixed to horizontal polarization. The present invention, however, is not limited to this. For example, the polarization type on the receiving side may be fixed and the polarization type on the transmitting side may be switched for each transmission process. Alternatively, the polarization type on the transmitting side may be fixed and the polarization type on the receiving side may be periodically switched.

The control station 101 which has transmitted the ACK frames (e.g., 602 and 603) advances the process to step S506. In step S506, the control station 101 determines whether it has received the training result frames from all the terminal stations in the training result frame reception standby process in step S504.

If the control station 101 determines in step S506 not to have received the training result frames from all the terminal stations, the process advances to step S507 to determine whether the time-out time Tw has elapsed. If the control station 101 determines that the time-out time Tw has not elapsed, the process returns to step S504 to repeat the processes in steps S504 to S506 until the time-out time Tw elapses.

On the other hand, if the control station 101 determines that the time-out time Tw has elapsed, the process returns to step S503. The control station 101 transmits a training frame 604, and repeats the processes in steps S503 to S506 until it receives training results from the all terminal stations.

If the control station 101 determines in step S506 to have received the training result frames from all terminal stations 1 to 5 (102 to 106), the process advances to step S508 to end the training processing.

6. Frames Used in Training Processing

The structure of each wireless frame (the training frame, training result frame, or ACK frame) used in the training processing will be explained next.

Figure 7:
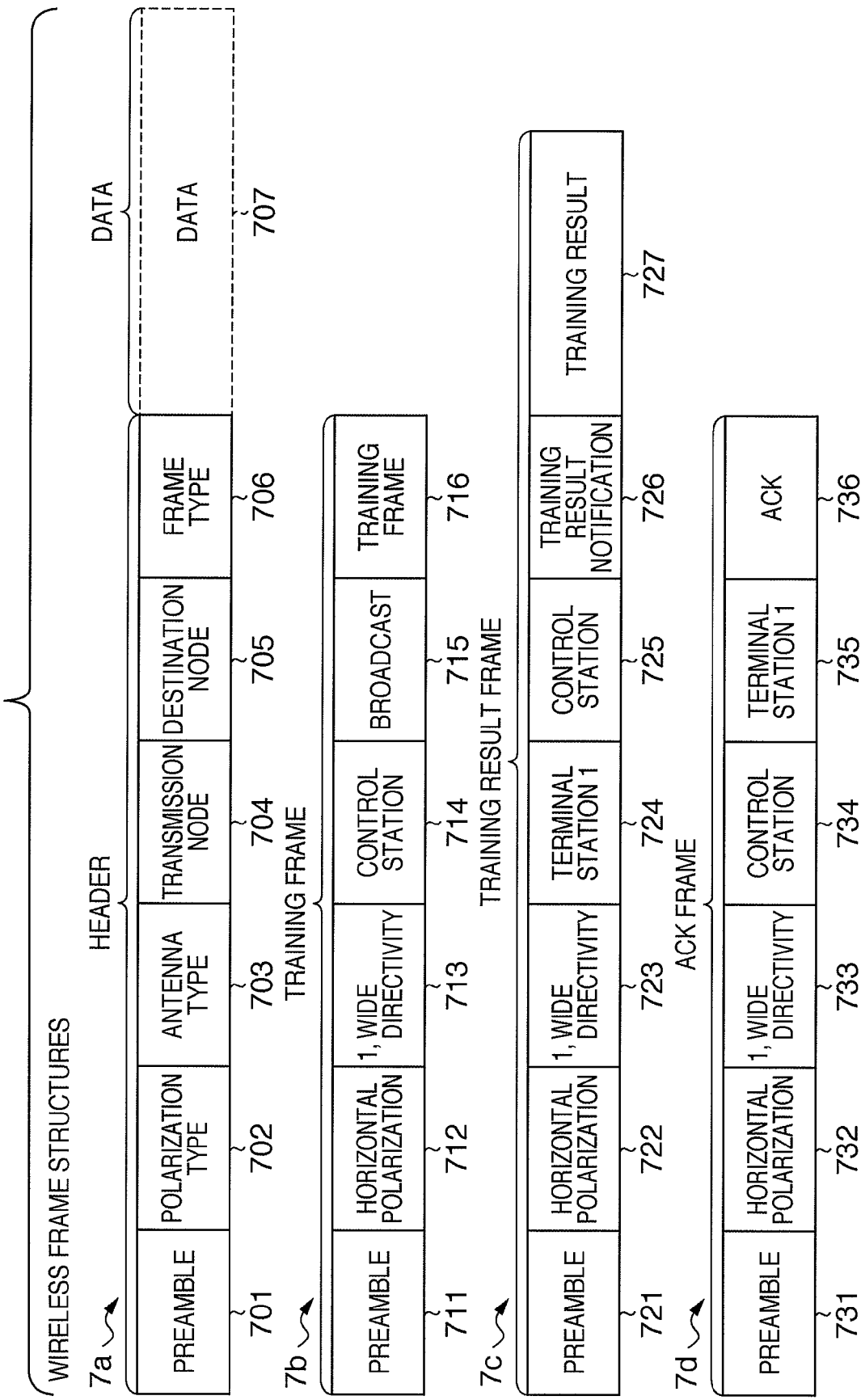
FIG. 7 is views showing the frame structures of wireless frames transmitted/received by the wireless communication system.

FIG. 7 7a is a view showing the basic frame structure of a wireless frame transmitted/received in the wireless communication system according to this embodiment. Reference numeral 701 denotes a preamble portion, which is formed by a predetermined signal pattern for synchronization. Fields 702 to 707 are formed by signals obtained by modulating various pieces of information.

The fields 702 to 707 store wireless signals obtained by modulating polarization type information, antenna type information, transmission node information, destination node information, frame type information, and data, respectively.

A portion from the polarization type information 702 to the frame type information 706 undergoes OFDM modulation at a low data rate. The data 707 is optional information, which is formed without any wireless signal or undergoes OFDM modulation at a low or high data rate.

The polarization type information 702 is information indicating the polarization type of an antenna which transmits this wireless frame, and indicates either horizontal polarization or vertical polarization.

The antenna type information 703 is information indicating the type of antenna which transmits this wireless frame, and is formed by an antenna number and directivity type. The antenna number is always "1" if the terminal station has only one antenna. If the terminal station has a plurality of antennas, the antennas are assigned numbers 1, 2, . . . , N, respectively, and thus the antenna type information 703 stores the number of the antenna which transmits this wireless frames.

In this embodiment, if the control station 101 transmits the wireless frame using the first vertical polarization transmission antenna 207 or the first horizontal polarization transmission antenna 208, the antenna number is "1". If the control station 101 transmits the wireless frame using the second vertical polarization transmission antenna 212 or the second horizontal polarization transmission antenna 213, the antenna number is "2".

The directivity type information is information indicating the type, and containing "wide directivity" or "narrow directivity". In this embodiment, since all the transmission antennas of the control station 101 and terminal stations 1 to 5 (102 to 106) transmit wireless frames with wide directivity, this polarization type information 702 always stores "wide directivity".

The transmission node information 704 stores the ID value of the control station or the terminal station, which transmits the wireless frame. The destination node information 705 stores the ID value of the control station or the terminal station, to which the wireless frame is destined. The ID value is a unique identification number previously assigned to each station. When the ID value of the destination node information 705 is "0", it indicates that the wireless frame is destined to not a specific terminal station but all the terminal stations.

The frame type information 706 is information indicating the type of wireless frame, the presence/absence of the subsequent data 707, and the type of transfer rate of the data 707. The type of wireless frame includes a training frame, training result frame, and ACK frame. The information on the transfer rate indicates whether the data 707 has undergone OFDM modulation at a high or low data rate.

FIG. 7 7b is a view showing an example of the training frame. A preamble 711 is a signal common to all the wireless frames. It is found from pieces of information 712, 713 and 714 that this wireless frame is transmitted from the wide directional antenna of the control station 101 with horizontal polarization. Furthermore, it is found from information 715 that the wireless frame is broadcast to all the terminal stations. The type of the frame is found to be a training frame on the basis of information 716.

FIG. 7 7c is a view showing an example of the training result frame. A preamble 721 is a signal common to all the wireless frames. It is found from pieces of information 722, 723, 724, and 725 that this wireless frame is transmitted from the wide directional antenna of terminal station 1 (102) to the control station 101 with horizontal polarization. Furthermore, it is found from information 726 that this wireless frame is a notification of the training result, and the training result frame is transmitted as information 727. Note that the signal of the training result 727 is transmitted at a low data rate.

FIG. 7 7d is a view showing an example of the ACK frame. A preamble is a signal common to all the wireless frames. It is found from pieces of information 731, 732, 733, 734, and 735 that this wireless frame is transmitted from the wide directional antenna of the control station 101 to terminal station 1 (102) with horizontal polarization. Furthermore, it is found from information 736 that the frame type of this wireless frame is an ACK frame.

7. Details of Scan Reception Processing of Training Frame in Terminal Station Details of the scan reception processing (step S512) of the training frame by terminal station 1 (102) will now be explained with reference to a flowchart in FIG. 8. Note that the processing by terminal stations 2 to 5 (103 to 106) is the same as that by terminal station 1 (102), and a description thereof will be omitted.

In step S801, terminal station 1 (102) starts timer 2 (304). In step S802, the terminal station sets the polarization type of the reception antenna to horizontal polarization, and stands by for reception. In step S803, the terminal station determines whether it has received a training frame. If the terminal station determines to have received a training frame, the process advances to step S804 to restart timer 2 (304) and synchronize the training frame with a frame cycle. In step S805, the terminal station stores the signal strength of the received training frame, the polarization type, and the beam direction of the reception antenna.

Upon completion of the processes in steps S804 and S805, or determining in step S803 that the terminal station has not received a training frame, the process advances to step S806. In step S806, the terminal station determines whether the time-out of timer 2 (304) has occurred. If the terminal station determines that the time-out of timer 2 has not occurred, the process returns to step S802 to stand by for horizontal polarization reception. Consequently, terminal station 1 (102) stands by for horizontal polarization reception for the interval of one frame.

If the terminal station determines in step S806 that the time-out of timer 2 has occurred, the process advances to step S807 to switch the polarization type of the reception antenna to vertical polarization, and stand by for reception.

In step S808, the terminal station determines whether it has received a training frame. If the terminal station determines to have received a training frame, the process advances to step S809 to synchronize the training frame with a frame cycle by restarting timer 2 (304). In step S810, the terminal station stores the signal strength of the received training frame, the polarization type, and the beam direction of the reception antenna.

Upon completion of the processes in steps S809 and S810, or determining in step S808 that the terminal station has not received a training frame, the process advances to step S811. In step S811, the terminal station determines whether the time-out of timer 2 (304) has occurred. If the terminal station determines that the time-out has not occurred, the process returns to step S807 to stand by for vertical polarization reception until the time-out occurs. As a result, terminal station 1 (102) stands by for vertical polarization reception for the interval of one frame.

If the terminal station determines in step S811 that the time-out of timer 2 has occurred, the process advances to step S812. In step S812, the terminal station determines whether the horizontal polarization reception standby process (steps S802 to S806) and the vertical polarization reception standby process (steps S807 to S811) are executed for the second time. If the terminal station determines that the processes are executed for the first time, the process returns to step S802 to repeat the processes in steps S802 to S811.

With this processing, terminal station 1 (102) performs, for four frame intervals, the processing for receiving a training frame while switching the polarization type between horizontal polarization and vertical polarization for each frame interval, by pointing the beam of the narrow directional antenna toward an initially set beam direction.

If the terminal station determines in step S812 that the processes are executed for the second time, the process advances to step S813. In step S813, the terminal station determines whether the beam of the reception antenna is pointed to the extreme end of 180°. If the terminal station determines in step S813 that the beam is not pointed to the extreme end of 180°, the process advances to step S814 to change the directivity direction of the reception antenna by shifting the beam direction 30° from the current angle. If the terminal station determines in step S813 that the beam is pointed to the extreme end of 180°, the process advances to step S815 to point the beam to 0° again.

In step S816, the terminal station determines whether the reception standby process (steps S802 to S812) has completed measurement in the current beam direction. If the terminal station determines in step S816 that the process has not completed measurement in the current beam direction, the process returns to step S802 in a state in which the beam direction of the reception antenna has been shifted 30° in step S814, and the processes in steps S802 to S812 are repeated; otherwise, the scan reception processing ends.

8. Practical Example of Scan Reception Processing

Figure 8:
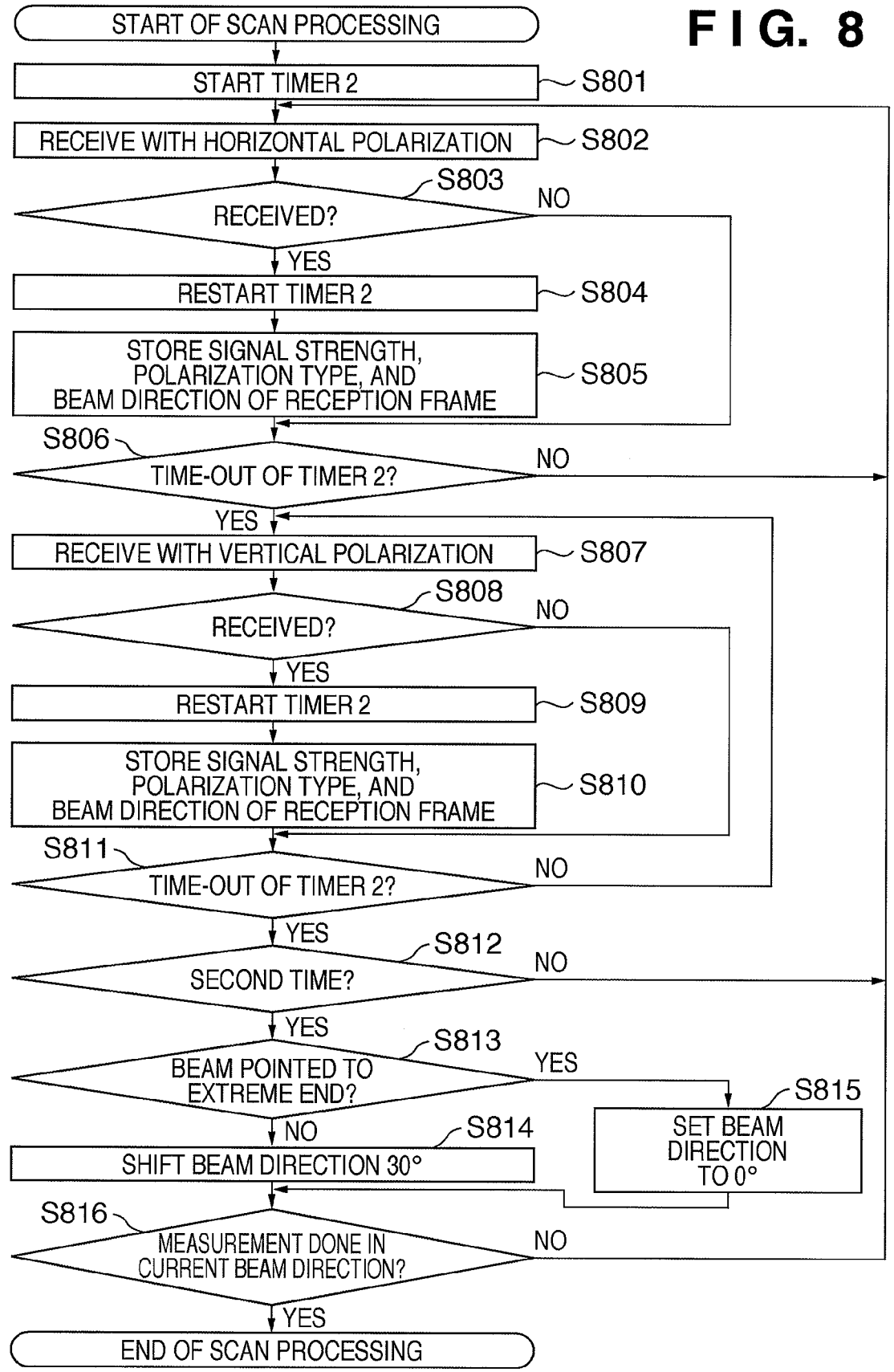
FIG. 8 is a flowchart illustrating the sequence of scan reception processing of a training frame by terminal station 1 (102)
Figure 9:
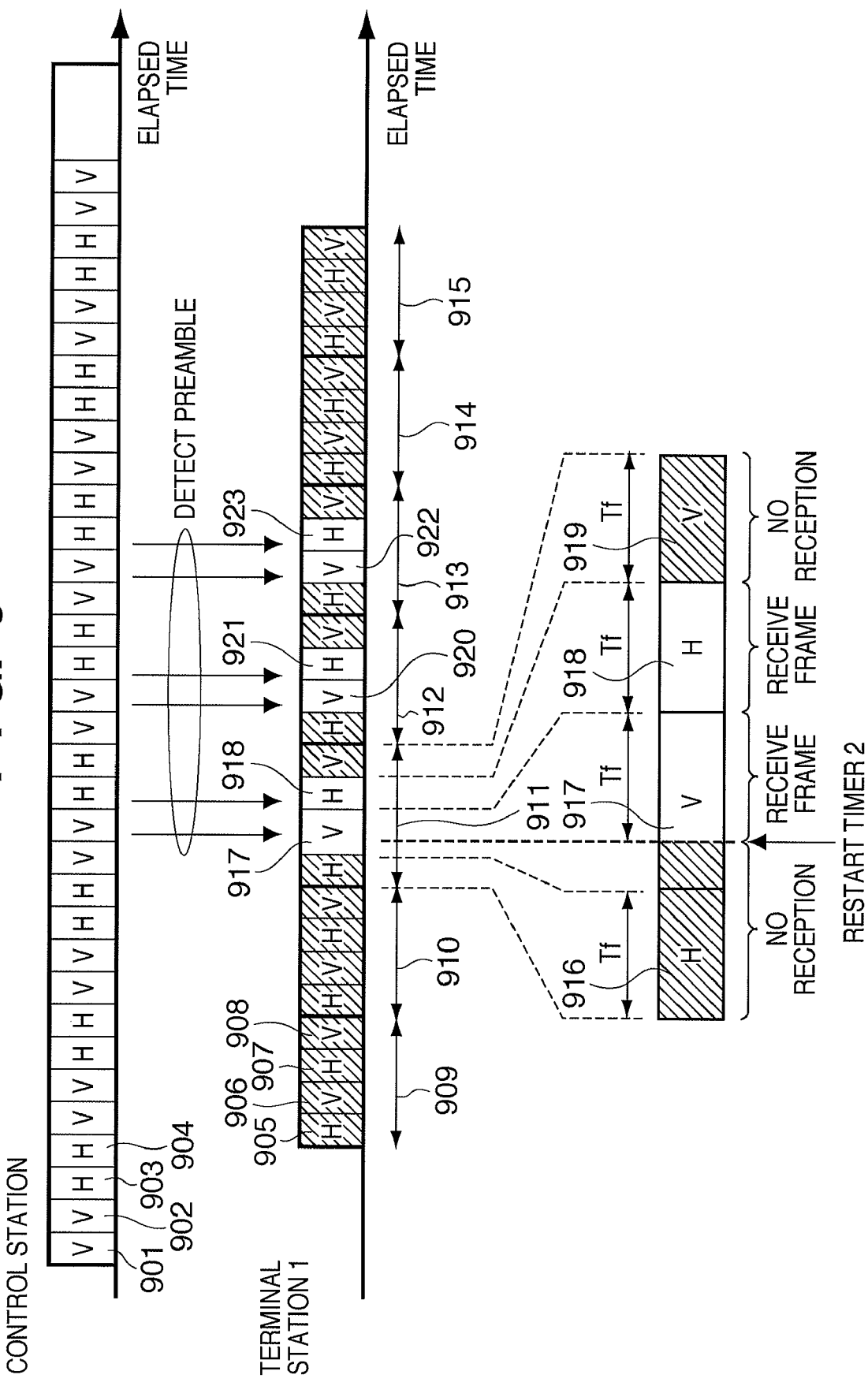
FIG. 9 is a view showing frames in the control station 101 and terminal station 1 (102) when the control station 101 transmits a training frame in a state in which terminal station 1 (102) executes the scan reception processing.

FIG. 9 shows wireless frames in the control station 101 and terminal station 1 (102) when the flowchart shown in FIG. 8 is executed and the control station 101 transmits a training frame (step S503).

Referring to FIG. 9, the upper part shows the transmission state of the control station 101, and the lower part shows the reception state of terminal station 1 (102). The horizontal axis plots an elapsed time. Assume that each of terminal stations 2 to 5 (103 to 106) performs the same operation as that by terminal station 1 (102) in accordance with timer 2 (304) of itself.

The control station 101 successively transmits a training frame. At this time, the control station 101 transmits, with vertical polarization, the training frame twice in accordance with a frame cycle counted by timer 1 (204) (901 and 902), and switches to horizontal polarization to continuously transmit the training frame twice (903 and 904). After that, the control station 101 switches back to vertical polarization to transmit the training frame twice, and then transmits the training frame with horizontal polarization twice.

In this manner, the control station 101 repeats transmission of the training frame while switching the polarization type for every two frames in accordance with timer 1 (204) independently of the operation cycle of each terminal station.

On the basis of the flowchart shown in FIG. 8, terminal station 1 (102) starts scan reception processing in accordance with a frame cycle counted by timer 2 (304) of its own which has started its operation independently of the operation cycle of the control station 101.

The scan reception processing of terminal station 1 (102) performs reception standby processing (909 to 915) for every cycle of N frames (in this case, N=4) in each beam direction while shifting the beam direction of the reception antenna between 0° and 180° in steps of 30°. That is, the scan reception processing switches the directivity direction for every cycle of the number of frames equal to the square of the number (N) of polarization types, and performs the reception standby processing.

In the reception standby processing for four frames, the first frame is assigned to horizontal polarization reception standby processing (905); the second frame, vertical polarization reception standby processing (906); the third frame, horizontal polarization reception standby processing (907); and the fourth frame, vertical polarization reception standby processing (908).

The scan reception processing is performed by changing the beam direction of the reception antenna to 0° (909), 30° (910), 60° (911), 90° (912), 120° (913), 150° (914), and 180° (915) for every four frames.

The control station 101 switches the polarization type for every cycle of two frames. Terminal station 1 (102) switches the polarization type for every cycle of one frame. Even if timer 1 (204) and timer 2 (304) are asynchronous with each other, the polarization types match at a certain timing within the interval of four frames. That is, by executing reception standby processing for the number of frame intervals equal to the square of the number (N) of the polarization types, the polarization types match within either of the frame intervals. If the beam of the reception antenna is pointed toward the control station 101, reception is possible when the polarization types match.

In the example of FIG. 9, when the beam of the reception antenna is pointed to 60° (911), 90° (920), or 120° (922), terminal station 1 (102) is pointed toward the control station 101. Terminal station 1 (102) stands by for reception with horizontal polarization for the interval Tf of one frame (916), and then stands by for reception with vertical polarization (917). During the vertical polarization reception standby time (917), when the control station 101 switches to vertical polarization, the reception succeeds. Upon this first success of the reception, the terminal station restarts timer 2 (304) (step S809) to synchronize timer 1 (204) of the control station 101 with the frame cycle Tf.

Since the restart of timer 1 (204) is synchronized with the timing of the preamble 711 of the training frame, timer 1 (204) is always restarted at the start of the frame cycle.

If the reception succeeds during the vertical polarization reception standby time (917), reception also succeeds during the subsequent horizontal polarization reception standby time (918). The reception strengths of those reception processes are detected, and stored along with information indicating the beam direction 60°.

Next, when the beam of the reception antenna of terminal station 1 (102) is pointed to 90°, the polarization types match and the reception succeeds during the vertical polarization reception standby time (920) and the horizontal polarization reception standby time (921). In this case, the reception strengths of those reception processes are detected, and stored along with information indicating the beam direction 90°.

Next, when the beam of the reception antenna of terminal station 1 (102) is pointed to 120°, the polarization types match and the reception succeeds during the horizontal polarization reception standby time (922) and the horizontal polarization reception standby time (923). In this case, the reception strengths of those reception processes are detected, and stored along with information indicating the beam direction 120°.

On the basis of the result of the scan reception processing, terminal station 1 (102) creates a scan result list representing the correspondences of the beam directions of the reception antenna, polarization types, and reception strengths, as shown in FIG. 10. Terminal station 1 (102) transmits, to the control station 101 as the training result 607, information 1001 pertaining to the beam direction 90° in which the best reception state is obtained.

As described above, upon completion of the training processing of the first antenna 110 of the control station 101, the user instructs to execute the training processing for the second antenna 111 of the control station 101. Even if the user does not instruct, however, the control station 101 may successively execute the training processing for both the first antenna 110 and the second antenna 111.

In the training processing of the second antenna 111, the second vertical polarization transmission antenna 212 and the second horizontal polarization transmission antenna 213, and the vertical polarization reception antenna 209 and the horizontal polarization reception antenna 210 are used, respectively. The training processing in this case is the same as that of the first antenna 110 explained above, and a description thereof will be omitted.

9. Method of Determining Optimum Transmission/Reception Conditions

As described above, upon completion of the training processing of the first antenna 110 and second antenna 111, and reception of the scan result lists from terminal stations 1 to 5 (102 to 106), the control station 101 creates a list shown in FIG. 11.

The list shown in FIG. 11 represents the reception state for each pair of an optimum beam direction and polarization type for the reception antenna in each terminal station. Reception strengths in the list shown in FIG. 11 are merely examples, and may vary in accordance with installation relations between the control station 101 and terminal stations 1to 5 (102 to 106).

In accordance with the list shown in FIG. 11, the control station 101 picks up the reception strengths of the terminal stations when using the first horizontal polarization transmission antenna 208 and the second vertical polarization transmission antenna 212. The control station 101 also picks up the reception strengths of the terminal stations when using the first vertical polarization transmission antenna 207 and the second horizontal polarization transmission antenna 213.

FIG. 12 shows a list of picked up reception strengths. The list shown in FIG. 12 indicates the reception strengths of the terminal stations when the first antenna 110 and second antenna 111 of the control station 101 simultaneously transmit data with different polarization types.

Referring to FIG. 12, a column 12*a* shows the reception strengths when each terminal station points its beam toward the first antenna 110 of the control station 101, and receives the data with horizontal polarization. A column 12*b* shows the reception strengths when each terminal station points its beam toward the second antenna 111 of the control station 101, and receives the data with vertical polarization. A column 12*c* shows the reception strengths when each terminal station points its beam toward the first antenna 110 of the control station 101, and receives the data with vertical polarization. A column 12*d* shows the reception strengths when each terminal station points its beam toward the second antenna 111 of the control station 101, and receives the data with horizontal polarization.

When the control station 101 transmits the identical data from the first antenna 110 with horizontal polarization, and from the second antenna 111 with vertical polarization (transmission condition 1), an optimum reception antenna of each terminal station is determined on the basis of FIG. 12.

Under transmission condition 1, it is possible to determine that terminal station 1 (102), terminal station 2 (103), and terminal station 4 (105) are preferably used to receive the data from the first antenna 110. It is also possible to determine that terminal station 3 (104) and terminal station 5 (106) are preferably used to receive the data from the second antenna 111. Assume that when the reception strengths are equal, the first antenna 110 is chosen.

When the control station 101 transmits the identical data from the first antenna 110 with vertical polarization, and from the second antenna 111 with horizontal polarization (transmission condition 2), an optimum reception antenna of each terminal station is determined on the basis of FIG. 12.

Under transmission condition 2, it is possible to determine that terminal station 1 (102), terminal station 2 (103), terminal station 4 (105), and terminal station 5 (106) are preferably used to receive the data from the first antenna 110. It is also possible to determine that terminal station 3 (104) is preferably used to receive the data from the second antenna 111.

At this time, the minimum values and maximum values of the reception strengths under transmission condition 1 and transmission condition 2 are compared and determined, respectively. Under transmission condition 1, the maximum value is "8" of terminal station 1 (102) and the minimum value is "3" of terminal station 5 (106). Under transmission condition 2, the maximum value is "7" of terminal station 1 (102) and the minimum value is "3" of terminal station 5 (106).

In transmitting stream data from the control station 101, therefore, it is possible to determine based on the list shown in FIG. 12 that when the control station 101 chooses the transmission antenna of itself to transmit the stream data under transmission condition 1, the reception conditions are better. Under transmission condition 1, it is possible to determine that terminal station 1 (102), terminal station 2 (103), and terminal station 4 (105) are preferably used to point the beams of their reception antennas toward the first antenna to receive the data with horizontal polarization. It is also possible to determine that terminal station 3 (104) and terminal station 5 (106) are preferably used to point the beams of their reception antennas toward the second antenna to receive the data with vertical polarization.

In accordance with the above determination results, the control station 101 transmits, to terminal station 1 (102), an instruction command to point the beam of the reception antenna toward the first antenna and receive the stream data with horizontal polarization. Similarly, the control station 101 transmits, to terminal station 2 (103), an instruction command to point the beam of the reception antenna toward the first antenna and receive the stream data with horizontal polarization.

Furthermore, the control station 101 transmits, to terminal station 4 (105), an instruction command to point the beam of the reception antenna toward the first antenna and receive the stream data with horizontal polarization. The control station 101 transmits, to terminal station 3 (104), an instruction command to point the beam of the reception antenna toward the second antenna and receive the stream data with vertical polarization. The control station 101 transmits, to terminal station 5 (106), an instruction command to point the beam of the reception antenna toward the second antenna and receive the stream data with vertical polarization.

10. Connection Based on Optimum Transmission/Reception Conditions

Figure 13:
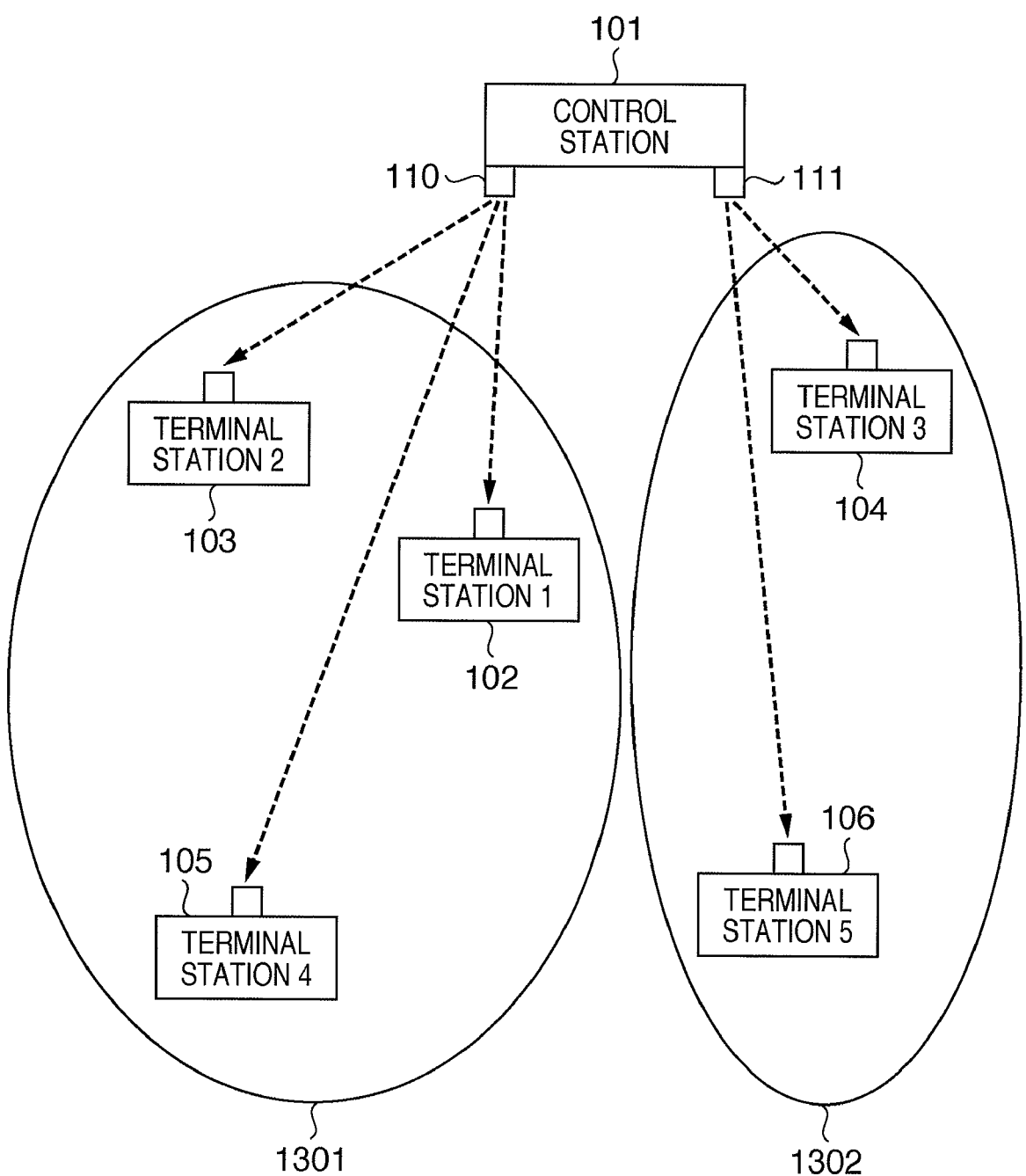
FIG. 13 is a view showing connection states between the control station 101 and the terminal stations.

Upon reception of the instruction command destined to the self station, each terminal station receives the stream data with the beam direction of the reception antenna and the polarization type which are instructed by the instruction command. FIG. 13 shows the connection state between the control station 101 and each terminal station in this case.

As shown in FIG. 13, terminal station 1 (102), terminal station 2 (103), and terminal station 4 (105) form a first group 1301 which receives the stream data from the first antenna 110. Terminal station 3 (104) and terminal station 5 (106) form a second group 1302 which receives the stream data from the second antenna 111.

Figure 14:
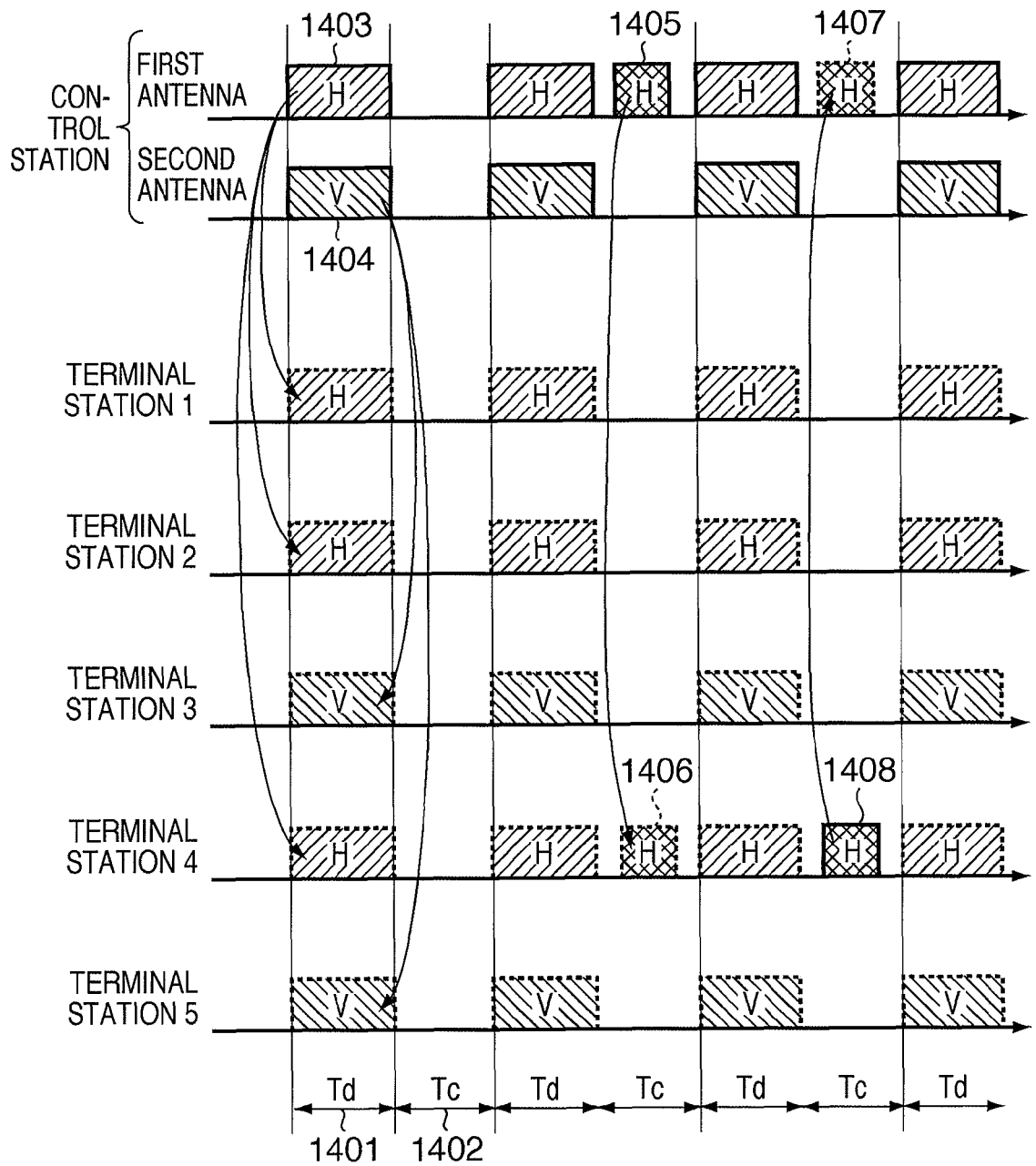
FIG. 14 shows timing charts for representing, along the elapsed time, the transmission state of stream data between the control 101 and terminal stations 1 to 5 (102 to 106) in the wireless communication system.

FIG. 14 shows, along the elapsed time, the stream data transmission states between the control station 101 and terminal stations 1 to 5 (102 to 106), which have been grouped as shown in FIG. 13, in the wireless communication system according to this embodiment.

Referring to FIG. 14, reference numeral 1401 denotes a wireless frame transfer interval Td during which stream data are transmitted; and 1402 is a permitted interval Tc during which it is possible to transfer control data. During the interval Td 1401, each terminal station points the beam of the directional antenna toward the first antenna 110 or second antenna 111, and stands by for reception. During the interval Td 1401, the control station 101 uses the wide directional antenna to transmit the stream data at a high data rate.

During the interval Tc 1402, the control station 101 or any one of the terminal stations which has control data to be transmitted can transmit the control data by exclusive control. The control data uses a wide directional antenna with horizontal polarization to transmit and receive a low data rate wireless frame.

Transmission of the stream data from the control station 101 is repeated during the interval Td for every cycle of Td+Tc. At this time, the control station 101 transmits a wireless frame 1403 containing stream data from the first antenna 110 with horizontal polarization, and simultaneously transmits a wireless frame 1404 containing the identical stream data from the second antenna 111.

During the interval Tc 1402, the control station 101 or terminal station which has control data to be transmitted performs two-way wireless communication of the control data by exclusive control which transmits the control data after detecting the absence of another radio wave.

As is apparent from the above explanation, according to the wireless communication system of this embodiment, each of terminal stations 1 to 5 (102 to 106) can efficiently determine an optimum polarization type and beam direction of the reception antenna on the basis of the training frame transmitted by the control station 101.

After that, by notifying the control station 101 of a determination result, the control station 101 can determine the polarization type of the transmission antenna used for transmitting the stream data, and notify each terminal station of the determined optimum polarization type and beam direction of the reception antenna. Consequently, it is possible to achieve high-reception quality communication.

According to the wireless communication system of this embodiment, the receiving side need not synchronize with the transmitting side before the training processing. The receiving side may synchronize with the transmitting side when detecting the training frame during the training processing.

That is, it is unnecessary to synchronize all the transmission and reception paths with each other in advance, and the training processing starts without previously synchronizing pairs of the multiplexing schemes and those of the beam directions between the transmitting side and the receiving side. Measurement can be done by sequentially switching the multiplexing schemes and the beam directions. Compared with the conventional training processing, therefore, it is possible to shorten the time necessary for synchronization.

In the wireless communication system according to this embodiment, even if there exist a plurality of transmission stations to increase the reliability, the stations can simultaneously transmit wireless signals with different polarization types to perform the training processing, thereby shortening the training processing time.

As described above, according to this embodiment, in the wireless communication system including a control station for broadcasting data, and a plurality of terminal stations for receiving the data, it is possible to shorten the time of the training processing for determining optimum transmission/reception conditions.

In this embodiment, the following case has been explained. That is, the control station transmits a training frame while switching horizontal polarization and vertical polarization every two frames, and each terminal station stands by for reception while switching horizontal polarization and vertical polarization every frame. The control station may transmit the frame while switching horizontal polarization and vertical polarization every frame, and each terminal station may stand by for reception while switching the polarization type every two frames.

Second Embodiment

In the above first embodiment, a case in which wireless signals are divided based on the polarization types has been explained. The present invention, however, is not limited to this. For example, a plurality of wireless signals may be divided by a code division multiplexing scheme using spread coding, which is called CDMA. Note that CDMA is an abbreviation for Code Division Multiple Access. Details of this embodiment will be described below.

<1. Internal Arrangement of Control Station>

Figure 15:
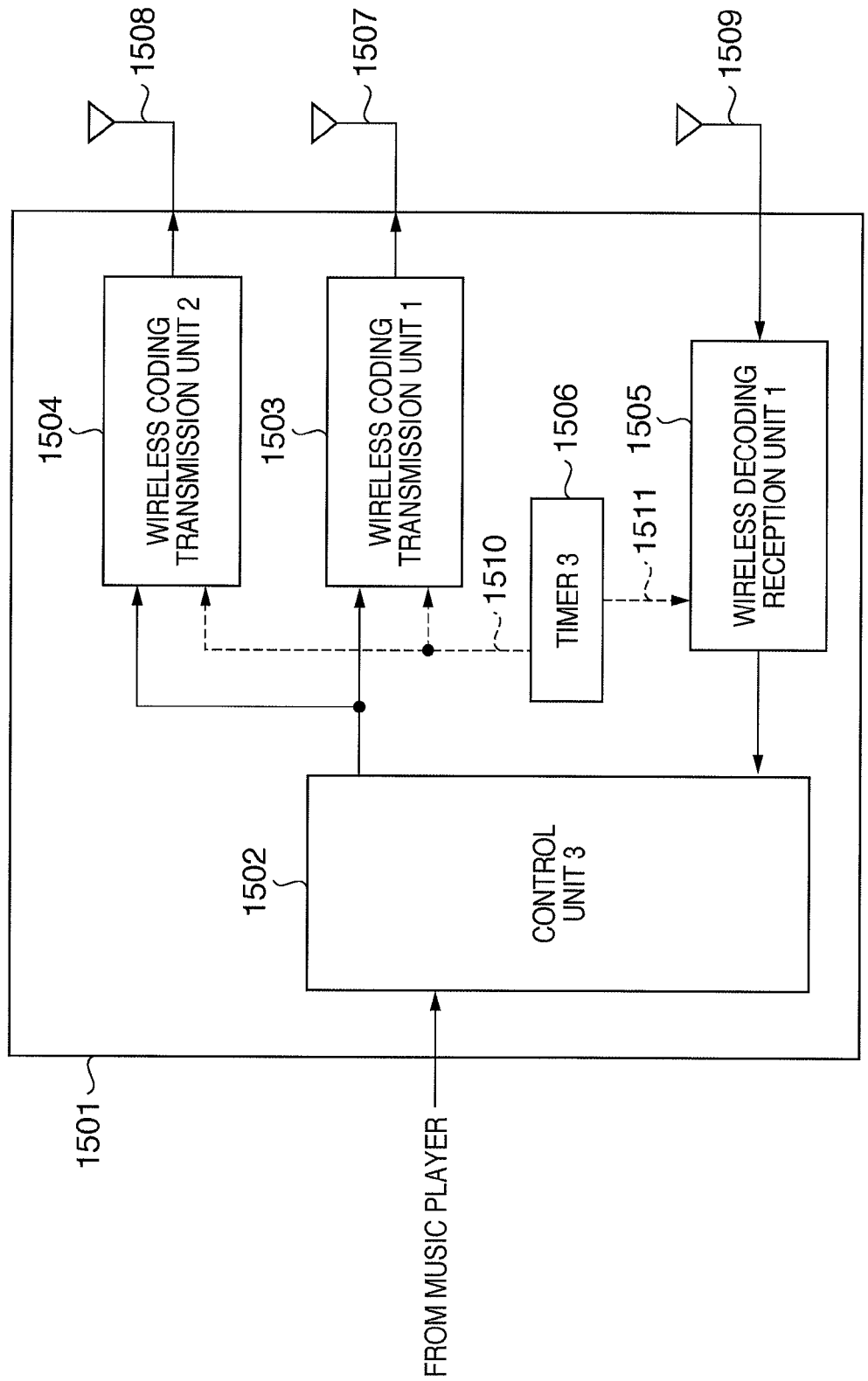
FIG. 15 is a block diagram showing the arrangement of a control station when a wireless signal multiplexing scheme using spread coding is utilized.
Figure 16:
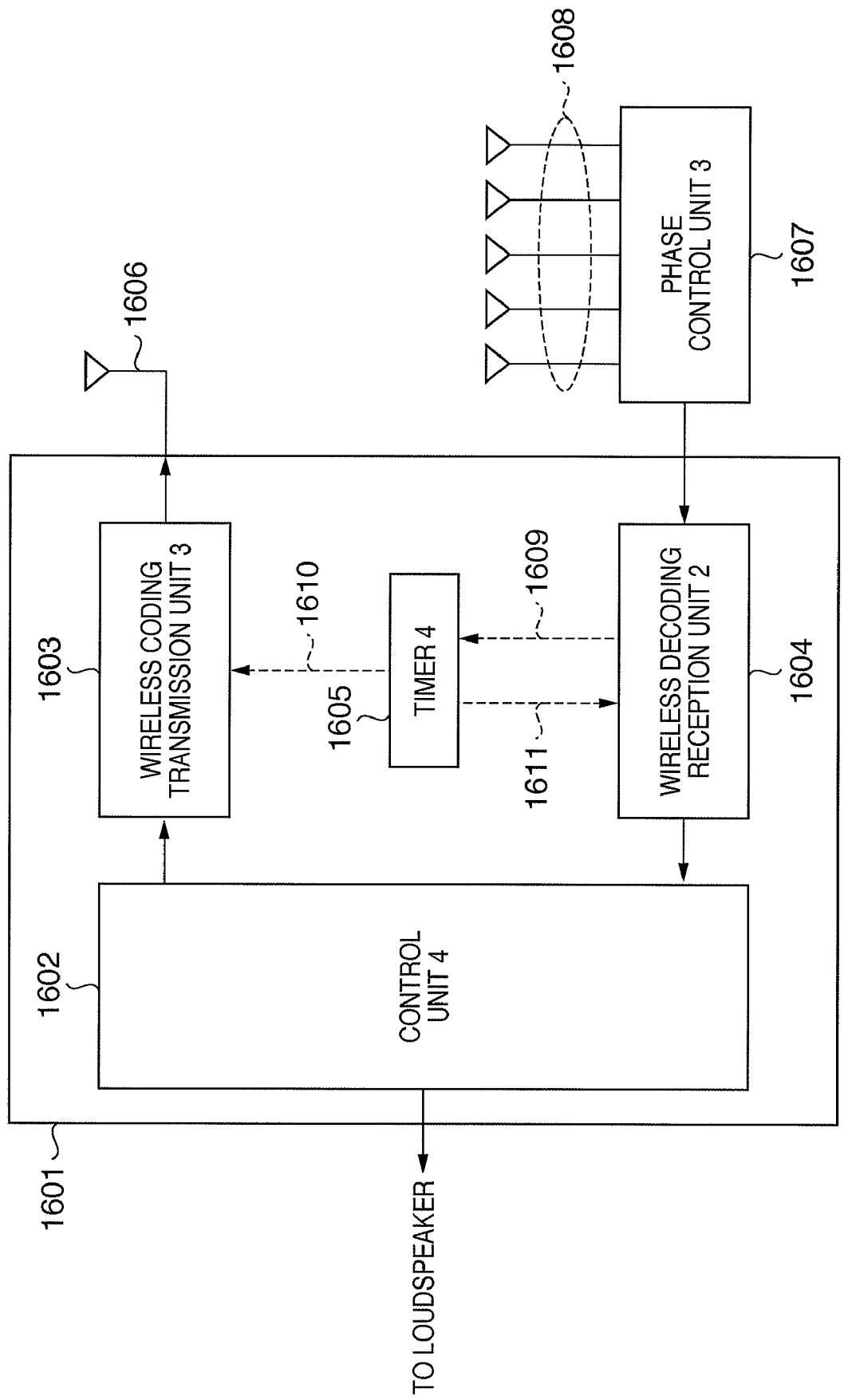
FIG. 16 is a block diagram showing the arrangement of a terminal station when a wireless signal multiplexing scheme using spread coding is utilized.

FIG. 15 shows the arrangement of a control station and FIG. 16 shows the arrangement of a terminal station, when a wireless signal multiplexing scheme using spread coding scheme is utilized.

Referring to FIG. 15, reference numeral 1501 denotes a CDMA control station; 1502, control unit 3 which controls the control station as a whole; 1503, wireless coding transmission unit 1 which performs spread coding on data by the CDMA scheme to obtain a wireless signal; and 1504, wireless coding transmission unit 2 which performs spread coding on data by the CDMA scheme to obtain a wireless signal.

Furthermore, reference numeral 1505 denotes wireless decoding reception unit 1 which decodes the wireless signal spread by the CDMA scheme into data; 1506, timer 3 which measures a wireless frame cycle; 1507 and 1508, transmission antennas; and 1509, a reception antenna.

<2. Internal Arrangement of Terminal Station>

Referring to FIG. 16, reference numeral 1601 denotes a CDMA terminal station; 1602, control unit 4 which controls the terminal station as a whole; 1603, wireless coding transmission unit 3 which performs spread coding on data by the CDMA scheme to obtain a wireless signal; 1604, wireless decoding reception unit 2 which despreads and decodes, into data, the wireless signal spread by the CDMA scheme; 1605, timer 4 which measures a wireless frame cycle; 1606, a transmission antenna; 1607, phase control unit 3; and 1608, a reception antenna array.

It is possible to configure a system similar to the wireless communication system shown in FIG. 1 by using a CDMA control station and a plurality of CDMA terminal stations with such arrangements.

In such wireless communication system, by substituting the first code signal and the second code signal for the horizontal polarization wireless signal and the vertical polarization wireless signal of the training processing procedure explained in the above first embodiment, it is possible to execute the same processing procedure. Assume that the first code signal and second code signal are coded using codes orthogonal to each other, as a matter of course. If the third and fourth orthogonal codes are used, it is possible to multiplex four types of signals, and transmit the multiplexed signal.

Instead of the code division multiplexing scheme, the frequency division multiplexing scheme which multiplexes signals at different frequencies may be used. In this case, it is also possible to configure a wireless communication system in the same manner as that described above. It is possible to efficiently determine optimum transmission/reception conditions with respect to modulation/demodulation by performing the similar training processing.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a computer-readable storage medium which records software program codes for implementing the functions of the above-described embodiments is supplied to a system or apparatus. The above functions are implemented when the computer (or the CPU or MPU) of the system or apparatus reads out and executes the program codes stored in the storage medium. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-099803, filed on Apr. 7, 2008, which is hereby incorporated by reference herein in its entirety.

What is claimed is:

1. A wireless communication system comprising:
a control station; and
a terminal station which receives, by using a directional antenna, a training signal transmitted from the control station,
the control station comprising a transmission unit configured to repeatedly transmit a training signal frame while sequentially switching N (N≧2) types of multiplexing schemes, and
the terminal station comprising:
a reception standby unit configured to stand by for reception of the training signal frame while switching the N types of multiplexing schemes at a cycle different from a switching cycle of the control station,
a changing unit configured to change a directivity direction of the directional antenna for each process of standing by for reception of the training signal frame during a frame period of a square of N, and
a detection unit configured to detect a reception state of a training signal frame received in each directivity direction of the directional antenna.

2. The system according to claim 1, wherein
the control station comprises a first timer for measuring a frame period during which the training signal frame is transmitted,
the transmission unit repeatedly transmits the training signal frame while sequentially switching the N types of multiplexing schemes, on the basis of the frame period measured by the first timer,
the terminal station comprises a second timer for measuring a frame period during which the training signal frame is received,
the reception standby unit stands by for reception of the training signal frame while switching the N types of multiplexing schemes at a cycle which is the frame period measured by the second timer and is different from the switching cycle of the control station, and
measurement of the second timer is reset at a timing of receiving the training signal frame.

3. The system according to claim 1, wherein
the transmission unit switches the N types of multiplexing schemes every N frame periods, and
the reception standby unit stands by for reception while switching the N types of multiplexing schemes every frame period.

4. The system according to claim 1, wherein
the transmission unit switches the N types of multiplexing schemes every frame period, and
the reception standby unit stands by for reception while switching the N types of multiplexing schemes every N frame periods.

5. The system according to claim 1, wherein the multiplexing schemes include polarization multiplexing, code division multiplexing, and frequency division multiplexing.

6. The system according to claim 1, wherein
the terminal station comprises a notification unit configured to notify the control station of a detection result by the detection unit, and
the control station determines, based on the detection results notified from a plurality of terminal stations, one multiplexing scheme among the N types of multiplexing schemes and a directivity direction to be used in receiving a wireless signal from the control station.

7. A terminal station for receiving, by using a directional antenna, a training signal frame repeatedly transmitted by a control station while sequentially switching N (N≧2) types of schemes, comprising:
a reception standby unit configured to stand by for reception of the training signal frame while switching the N type of schemes at a cycle different from a switching cycle of the control station;
a changing unit configured to change a directivity direction of the directional antenna for each process of standing by for reception of the training signal frame during a frame period of a square of N, and
a detection unit configured to detect a reception state of a training signal frame received in each directivity direction of the directional antenna.

8. The terminal station according to claim 7, further comprising
a second timer for measuring a frame period during which the training signal frame is received,
wherein the reception standby unit stands by for reception of the training signal frame while switching the N types of multiplexing schemes at a cycle which is the frame period measured by the second timer and is different from the switching cycle of the control station, and
measurement of the second timer is reset at a timing of receiving the training signal frame.

9. The terminal station according to claim 7, wherein
the control station switches the N types of multiplexing schemes every N frame periods, and
the reception standby unit stands by for reception while switching the N types of multiplexing schemes every frame period.

10. The terminal station according to claim 7, wherein
the control station switches the N types of multiplexing schemes every frame period, and
the reception standby unit stands by for reception while switching the N types of multiplexing schemes every N frame periods.

11. The terminal station according to claim 7, wherein the multiplexing schemes include polarization multiplexing, code division multiplexing, and frequency division multiplexing.

12. The terminal station according to claim 7, further comprising
a notification unit configured to notify the control station of a detection result by the detection unit.

13. A wireless communication method for a terminal station which receives, by using a directional antenna, a training signal frame repeatedly transmitted by a control station while sequentially switching N (N≧2) types of schemes, comprising:
standing by for reception of the training signal frame while switching the N types of schemes at a cycle different from a switching cycle of the control station;
changing a directivity direction of the directional antenna for each process of standing by for reception of the training signal frame during a frame period of a square of N; and
detecting a reception state of a training signal frame received in each directivity direction of the directional antenna.

14. A non-transitory computer-readable storage medium for storing a program which causes a computer to execute the wireless communication method according to claim 13.

* * * * *